Figure 1:
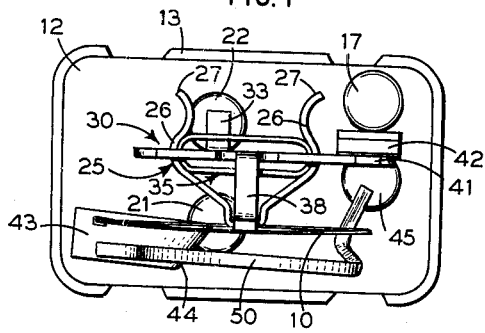

Aug. 17, 1965  A. F. BLEIWEISS ETAL  3,201,547
COMPENSATED THERMOMOTIVE FLASHER
Filed Aug. 11, 1961

INVENTORS
Arthur F. Bleiweiss
George Colombo
John B. Dickson
BY Blum, Moscovitz,
Friedman & Blum
ATTORNEYS United States Patent Office 3,201,547
Patented Aug. 17, 1965

3,201,547
COMPENSATED THERMOMOTIVE FLASHER
Arthur F. Bleiweiss, Great Neck, George Colombo, East Rockaway, and John B. Dickson, Kew Gardens, N.Y., assignors to Signal-Stat Corporation, Brooklyn, N.Y., a corporation of New York
Filed Aug. 11, 1961, Ser. No. 130,949
10 Claims. (Cl. 200—122)

This invention relates to thermomotive flashers or circuit breakers and, more particularly, to such a flasher or circuit breaker incorporating novel voltage and ambient temperature compensating means effective to modulate the circuit constants of the flasher or circuit breaker in accordance with changes in operating voltage, current drain, or ambient temperature, or all three.

Flashers and automatic circuit breakers are commonly used in automotive vehicles for flashing signalling lamps, such as turn signal lamps, flare lamps and the like. The flashes so used in automotive applications generally are thermomotive flashers of either the series, or current-operated, type, or the shunt, or voltage-operated, type. While thermomotive actuated automotive vehicle flashers are simpler and much less expensive than other types of flashers, such as, for example, motor driven commutators, they have the disadvantage of being very sensitive to changes in operating voltage and ambient temperature, these changes affecting the cycling rates of the flashers, and sometimes the on-off time ratios thereof.

As will be appreciated by those skilled in the art, voltage fluctuations are characteristic of the electrical systems of automotive vehicles, which generally comprise a battery and a generator connected in parallel, with the voltage varying within limits even though voltage regulation is employed with the generator. For example, a nominal twelve-volt automotive vehicle electrical system may vary from eleven volts to about fifteen volts. This is a substantial percentage variation in the nominal voltage supply, and results in a correspondingly very substantial change in the operating characteristics of thermomotive flashers.

Part of the reason for the variation in performance of thermomotive flashers with variations in ambient temperature and operating voltage is the fact that the heating element of a thermomotive flasher is an electrically conductive element having an electrical resistance such that the load current is capable of elevating its temperature by a substantial amount. As a result of such elevation on its temperature, the operating element will expand in accordance with its temperature coefficient of expansion, being directly or indirectly heated by the heating element.

In the case of the aforementioned shunt type flasher, the operating element is connected in parallel with the load circuit controlling contacts of the flasher, and the latter are normally open. Thus, when the circuit is energized, the load current will flow entirely through the operating element and the resistance drop across the operating element is such that there is an insufficient voltage drop across the usual incandescent signal lamps to effectively illuminate the latter. As the operating element is heated to a point where it has expanded by a predetermined amount, the contacts are snapped closed, effectively shunting the operating element and allowing substantially the full applied voltage to be effective upon the signal lamps, which thereupon became effectively illuminated. During this period, the shunted operating element cools and contracts and, after a predetermined contraction, snaps open the flasher load carrying contacts, and the cycle repeats.

In the aforementioned series type flasher, the operating element is connected in series with the flasher load carrying contacts, and these contacts are normally closed. When the signalling circuit is energized, the load current flows across the contacts and through the operating element and the signal lamps. In this case, the overall resistance of the operating element is made very substantially less than the operating element of a shunt type flasher, so that the effective voltage drop across the signal lamps is sufficient to effectively illuminate the latter. As the operating element heats and expands, it eventually snaps open the load circuit contacts so that the circuit is open and the signal lamps become extinguished. The operating element thereupon cools and contracts and, after a predetermined contraction, recloses the load carrying contacts of the flasher to again complete the circuit.

Thus, the operating element of either a shunt type flasher or a series type flasher is subjected, during its heating, to at least part of the potential applied across the circuit in which the flasher is connected, so that the part of the voltage drop across the operating element will vary with the circuit voltage. As a result, the rate of expansion of the operating element will also vary with the load voltage. Additionally, the rate of expansion and contraction of the operating element will also vary with ambient temperature.

The foregoing will be clear when it is considered that, if the ambient temperature remains constant, the heating energy W required to expand the operating element a pre-set amount, and which is a constant with constant ambient temperature, is equal to the product of the voltage drop E across the heating element, current I therethrough and time T, or, expressed as an equation:

$$W=EIT$$

As the factor W remains constant, the time T will vary inversely with any variation in either E or I with the other of these latter two factors remaining constant.

Under standards set by the Society of Automotive Engineers (SAE), the voltage drop across automotive flashers is held to 0.4 volt. As the major part of the voltage drop across a flasher occurs in the operating element thereof, it may be safely assumed that the voltage drop across the operating element would be approximately 0.3 volt, due to the resistance of this element. However, even if the pull ribbon or operating element is not subjected to the full applied voltage, but only to a small fraction thereof, the percentage change in the voltage drop across the pull ribbon will be substantially equal to the percentage change in the applied voltage.

The signal lamps used are incandescent lamps, and the filaments of these lamps have a very high temperature coefficient of resistivity. As a result of this, while the resistance of the signal lamps varies substantially with the current flow therethrough, by comparison with the resistance of the signal lamps, the resistance of the flasher is substantially stable for all practical purposes. However, both the voltage drop across the flasher and the current flow through the flasher vary with the applied voltage and, with W remaining constant, the operating time T will vary inversely with applied voltage. This means that the cycling rate of the flasher increases with the operating voltage, and vice versa.

On the other hand, if the voltage remains constant but the abient temperature increases, the electrical energy input required to expand the operating element such pre-set amount will be decreased by the increment of heat input due to the increased ambient temperature. Consequently, the heating time T will be proportionately decreased and the cycling rate will be increased. Stated another way, the required electrical energy input W varies inversely with the ambient temperature, so that, with E and I remaining constant, T decreases and the cycling rate, which varies as the reciprocal of T, increases. In accordance with the present invention, a resistance is connected, in series with a normally open switch, across the load carrying contacts of the flasher and in shunt with the operating element. The normally open switch includes a fixed contact and a movable contact. The operation of the movable contact into engagement with the fixed contact is effected by a winding which is subjected to the voltage drop across the flasher. The parts are so designed that, when the operating voltage is at or below an average value (such as twelve or thirteen volts), the switch remains open and the resistance is out of circuit. When the voltage increases above the average value, the operating winding effects closure of the switch so as to connect the resistance across the load contacts and in shunt with the flasher operating element. This decreases the rate of heating of the thermal operator or operating element, thereby to increase the heating time required to effect sufficient expansion of the operating element to obtain opening of the load carrying contact. Consequently, with an increase in the voltage above normal, which ordinairly would result in an increase in the rate of operation of the flasher, the rate is maintained substantially constant by correspondingly cutting down the heating current flow effective upon the thermal operation of the flasher.

The invention is applicable to any type of thermomotive flasher involving a high electrical heating responsive expansible operating element which effects opening and closing of the main load contacts of the flasher. However, it is particularly effective when applied to a thermomotive flasher of the type incorporating a snap action vane and pull ribbon, such as shown, for example, in Welsh U.S. Patent 2,756,304, issued July 24, 1956. As applied to this particular type of thermomotive flasher, the resistance is connected in shunt with the pull ribbon or pull element which constitutes the heat expansible operating element for this type of flasher. In order to provide a specific but non-limiting example of the application of the principles of the invention, the invention will therefore be described as applied to the Welsh type of thermomotive flasher, although it will be understood that the principles of the invention are not limited thereto but are applicable to any type of thermomotive flasher involving an electrical heat expansible operating element.

In one form which the invention may take in practice, the movable contact of the mentioned normally open switch is carried by or is part of the movable armature of a relay whose winding constitutes the aforementioned operating winding and, when the voltage exceeds a preselected value, such as twelve or thirteen volts, for example, the relay winding is energized sufficiently to transfer the armature and thereby close the relay contacts to connect the resistance effectively in shunt with the heat expansible operating element. As a feature of this form of the invention, the closing of the relay contacts augments the current flow through the relay winding thereby tending to hold-in the relay contacts irrespective of minor changes in current or voltage.

In another embodiment of the invention, the movable contact of the mentioned normally open switch is carried by the end of a thermomotive arm, such as a bimetal arm, and the aforementioned operating winding comprises a heating winding for the thermomotive arm. When the voltage increases above a pre-set average value such as, for example, twelve or thirteen volts, the heating of the thermomotive arm by its heating winding is such that the arm will deflect sufficiently to engage the movable contact with the fixed contact. Preferably, the fixed contact is carried by another thermomotive arm or elongated element which is responsive to ambient temperature, and the parts are so arranged that the position of the relatively fixed contact of the normally open switch corresponds to the prevailing ambient temperature, so that the effect of the latter is taken into consideration.

Figure 2:
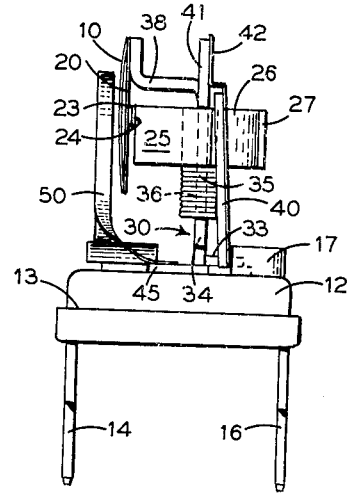
Figure 3:
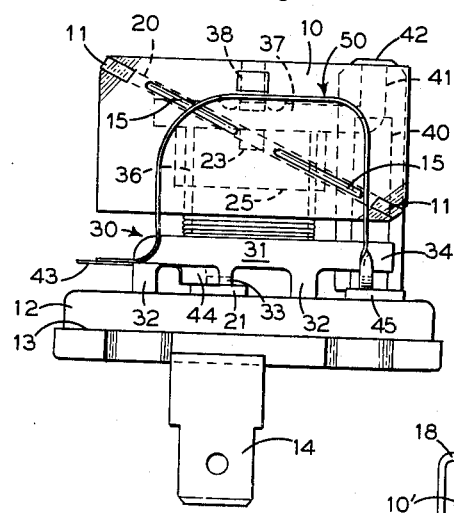
Figure 4:
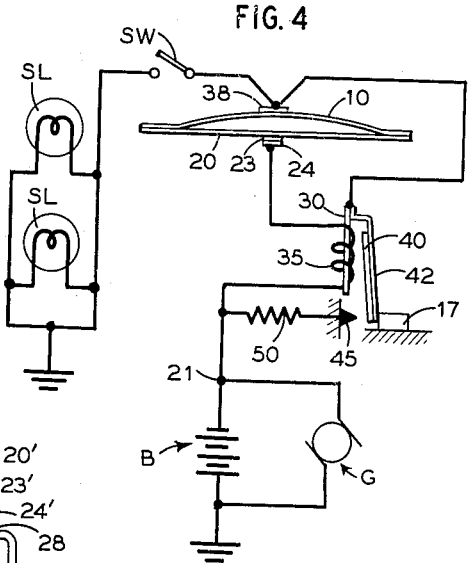
Figure 5:
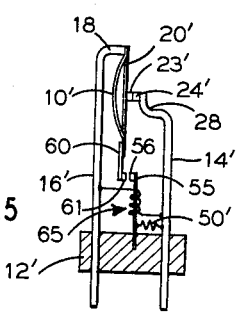

For an understanding of the principles of the invention, reference is made to the following description of typical embodiments thereof as illustrated in the accompanying drawings. In the drawings:

FIG. 1 is a plan view of one embodiment of the flasher;
FIG. 2 is an end elevational view thereof;
FIG. 3 is a side elevational view thereof;
FIG. 4 is a schematic wiring diagram corresponding to the flasher shown in FIGS. 1, 2 and 3; and
FIG. 5 is a somewhat schematic and partially vertical sectional view of another embodiment of the flasher incorporating the invention.

Referring first to the embodiment of the invention shown in FIGS. 1 through 4, the principal operating components of the flasher are a snap action, preferably electrically conductive, metal vane 10 to which is attached to a pull ribbon 20 of electrically conductive thermally expansible metal whose resistance is such that the load current is capable of elevating its temperature by a substantial amount. As explained in said Welsh patent, vane 10 is formed with linearly extending aligned and spaced pre-set deformations 15 extending diagonally thereacross, providing an initial bending line about which the vane is bent in its "restored" position. At the ends of this diagonal, the corners 11 of the vane are bent out of the general plane of the vane and the opposite ends of pull ribbon 20 are permanently secured thereto as by soldering, brazing, or the like. Pull ribbon 20 is secured to vane 10 in the cold contracted condition of the pull ribbon and while the vane is bent about another bend line extending at an angle to the deformations 15 so that the vane, with the pull ribbon 20 attached thereto, is bent about this other line in a "stress-deformed" condition. The bending of vane 10 to the "stress-deformed" condition stores potential energy in the vane so that the latter tends always to snap back to the "restored" condition as soon as the tension, holding it in the "stress-deformed" condition, is released.

As the temperature of pull ribbon 20 increases due to the flow of electric current therethrough, the pull ribbon expands and, after a predetermined expansion of the pull ribbon, the potential energy in the vane 10 overcomes the holding force of ribbon 20 and vane 10 snaps to its "restored" position in which is bent about the deformations 15—15. As the pull ribbon 20 cools and contracts, it snaps the vane 10 back to the "stress-deformed" condition in which it is bent about a line extending at an angle to the line of deformation 15—15.

As further explained in said Welsh patent, when vane 10 is fixedly supported at a zone or point spaced laterally of the bend line 15—15, a movable portion of the vane will have a relatively high amplitude of movement when the vane is alternately snapped between its "restored" and "stress-deformed" positions.

The flasher operating elements are supported upon a dielectric base 12 which, in the form illustrated, is substantially rectangular with rounded corners and has a ledge 13 extending therearound. This ledge 13 serves to seat a metal casing (not shown) for the flasher parts. A pair of conductive metal prongs, lugs or blades 14 and 16 extend downwardly from base 12 adjacent each side thereof for connection of the flasher into a suitable receptacle or the like, these lugs being anchored to the base by headed rivets 21 and 22, respectively, constituting electrically conductive abutments. For a purpose to be described, a third rivet 45, constituting an electrically conductive abutment, is secured through the base 12 adjacent one edge thereof and in lateral alignment with this rivet, a cylindrical dielectric boss, an abutment, 17 extends upwardly from base 12 and is preferably integral therewith. The purpose of rivet 45 and boss 17 will be described more fully hereinafter.

A generally H-shaped relay core or frame 30, of paramagnetic material, is supported on base 12 and serves as a support for the major components of the flasher. Core or frame 30 includes a lower transverse leg 31 which has feet 32 engaging the upper surface of base 12 and a tab 33 which is brazed, soldered, or spot welded to the rivet 22 and is thus in electrical contact with the lug 16. It will be noted that an end 34 of lower leg 31 projects outwardly and substantially over the rivet 45. A stem or cross bar 36 extends upwardly from substantially the center of the lower leg 31 and an upper transverse leg 37 is integral with the upper end of the stem or crossbar 36. An arm 38 is bent substantially centrally from bar 37 to extend horizontally and then upwardly, and the free end of this arm is spot welded or brazed to the vane 10 and thus constitutes a fixed support therefor. The relay winding 35, which is an insulating winding preferably provided with a high heat resistant insulation, is indicated as wound on the upright crossbar or stem 36.

As may be seen in FIG. 3 particularly, the right end of upper leg 37 projects somewhat outwardly and then upwardly, as indicated at 41. A relatively wide electrically conductive metal armature spring 42 is spot welded or brazed at its upper end to the leg end 41, and this spring is stepped a short distance from its upper end so that the major part of its length extends along and is integrally secured to the paramagnetic metal armature 40 of the relay. In effect, spring 42 resiliently pivotally suspends armature 40 for swinging movement. This bias of spring 42 is so selected that normally the armature 40, and specifically the lower end of spring 42, is engaged with the cylindrical dielectric stop 17 on the base 12. Also, the armature 40 is substantially aligned with the right hand extension 34 of the lower crossbar 31, to provide a magnetizable air gap between these two parts. When a sufficient potential is applied to the winding 35, the armature 40 is attracted toward the extension 34 and will thus engage the rivet 45 which constitutes the fixed contact of the relay.

Substantially at its center, the pull ribbon 20 carries a movable load contact 23 which is normally engaged with a relatively fixed load contact 24. Contact 24 is carried on a projection of a symmetrical yoke or saddle 25, which is formed of relatively conductive spring metal. Yoke 25 has spring legs 26 with outturned ends 27, whereby it may be snapped over the winding 35. The relation of parts is such that the fixed contact 24 is so disposed that it is engaged by the movable contact 23 in the cold contracted condition of pull ribbon 20, wherein vane 10 is held snapped to its stress-deformed position. The load circuit through the flasher is thus normally closed.

At this point, it might be well to point out that one end of winding 35 is electrically connected to the yoke or saddle 25 and the other end thereof is electrically connected to the rivet 21 holding the lug or prong 14 to the base 12, and electrically connected with such lug or prong. Thus, when the flasher is connected in circuit, the current flows from prong 14 through rivet 21, relay winding 35, yoke or saddle 25, fixed contact 24, movable contact 23, and into pull ribbon 20. In the pull ribbon, the current divides and flows in two paths from the contact 23 to the ends of the pull ribbon and thus into the vane 10 which is connected to the arm 38 forming part of the relay core 30 which is electrically and mechanically connected to the rivet 22 holding the prong 16 to the base and electrically connected thereto.

In accordance with the invention, an electrical resistance, such as a ribbon 50 preferably of the same material as the pull ribbon 20, has one end connected, as by soldering, brazing, or spot welding, to the rivet 45. The resistance ribbon 50 then extends in an expansion loop upwardly and laterally and then downwardly adjacent but spaced from the vane 10. The opposite end of ribbon 50 is welded, brazed, or spot welded to a connection strip 43 which has a short downturned end 44 welded, brazed or spot welded to the rivet 21.

The operation of the flasher illustrated in FIGS. 1, 2 and 3 will be understood best by reference to the schematic wiring diagram of FIG. 4. In this wiring diagram, the usual battery-generator automotive electrical system is illustrated as comprising a parallel connected battery B and generator G. The flasher is indicated as connected through a switch SW to grounded signal lamps SL. When switch SW is closed, current will flow from battery B through winding 35, contacts 24 and 23, pull ribbon 20, vane 10, arm 38, switch SW, and lamps SL. This current will heat the pull ribbon 20 and, after a predetermined heating thereof, the latter will expand sufficiently for the vane 10 to snap to its "restored" condition about its pivoting connection to the arm 38, and thereby move that portion of the vane carrying the pull ribbon 20 sufficiently to snap apart the contacts 23 and 24 to open the circuit. The pull ribbon 20 then cools and contracts and, after predetermined contraction, snaps the vane 10 back from its "restored" position to its "stress-deformed" condition wherein the contacts 23 and 24 are again snapped into engagement to re-close the circuit. It will be noted that the load current of the flasher flows through the relay coil 35.

The constants of the components are so selected that, when the voltage of the battery-generator system is at or below a predetermined average value, such as twelve or thirteen volts, the relay coil 35 is insufficiently energized to effect operation of the armature 40. However, at voltage values above such average value, relay coil 35 is sufficiently energized so that armature 40 is attracted to engage the fixed relay contact 45. It will be observed that this connects the resistance ribbon 50 in shunt with the pull ribbon 20. Consequently, part of the current normally flowing through the pull ribbon is diverted through the resistance 50, thus cutting down the current flow through the pull ribbon. The latter thus will take longer to heat and expand sufficiently to allow snapping apart of the contacts 23 and 24. This action, by slowing down the action of the pull ribbon 20, compensates for the normally increased rate of opeartion of the flasher which would occur with such increase in voltage, and thus the rate of operation of the flasher is maintained constant.

In the embodiment of the invention shown in FIG. 5, parts identical with or corresponding to those shown in FIGS. 1, 2 and 3 have been given the same reference characters primed. In this embodiment, the lugs or prongs 14' and 16' are molded integrally with the base 12' and extend substantially thereabove to support the operating parts of the flasher. Thus, the lug 16' has a bent-over upper end 18 which is welded, brazed or spot welded to the vane 10'. Similarly, the upper end of prong 14' is bent inwardly and then upwardly, as at 28, and carries the fixed contact 24' cooperable with the contact 23' carried by the pull ribbon 20'.

An elongated thermomotive element, such as a bimetal arm 55, is molded integrally into the base 12' and extends upwardly therefrom intermediate the upwardly extending parts of the prongs 14' and 16'. A contact 56 is provided on the upper end of arm 55 and is cooperable with a contact 61 on the free end of a thermomotive element, such as a bimetal arm 60, which has its other end fixed to the vane 10'. A high electrical resistance insulated heating winding 65 is wound around the bimetal arm 55 and is connected between the prongs 14' and 16'. Shunting resistance 50', corresponding to the resistance ribbon 50 of FIGS. 1, 2 and 3, is schematically illustrated as electrically connected between the prong 14' and the bimetal arm 55.

The arrangement of FIG. 5 operates in the following manner. When the load circuit of the flasher is closed, a potential is impressed between the prongs 14' and 16' but the heating winding 65 is shunted by the closed contacts 23', 24'. Due to the flow of the current, the pull ribbon 20' will expand to eventually snap the vane 10' to a position separating the contacts 23' and 24' and interrupting the current flow through the pull ribbon and to the load. The heating winding 65 is subjected to substantially the full open circuit voltage and the heating of arm 55 is thus proportional to such voltage. The pull ribbon 20' will then contract to again snap the contacts 23' and 24' into engagement with each other. At a voltage below a pre-set average voltage, such as twelve or thirteen volts, for example, the heating effect of winding 65 on the bimetal arm 55 is insufficient to deflect the latter enough to engage contacts 56 and 61. However, at or above this value, the bimetal arm 55 will be deflected sufficiently to engage the contacts 56 and 61 and thus cut the resistance 50' into shunt relation with the pull ribbon 20'. The effect is the same as in the embodiment of the flasher shown in FIGS. 1, 2 and 3, in that the current flow through the pull ribbon 20' is decreased and thus the time required to heat the latter an amount sufficient to expand the degree required to permit snapping of vane 10' to the restored position is increased, thus compensating for any increased heating effect or heating rate of pull ribbon 20' due to the increase in voltage.

The relatively short bimetal arm 60 is provided for ambient temperature compensation. This arm 60, when the ambient temperature increases, is arranged to deflect in such a manner as to bring the contact 61 nearer to the contact 56 so that these two contacts will become engaged at a relatively lower value of voltage. Should the ambient temperature increase sufficiently, with the voltage remaining at or below the pre-selected average value, a condition may occur where the contacts 61 and 56 will be engaged to cut the resistance 50' into circuit even though the voltage does not increase above the average value. Conversely, as the ambient temperature decreases below a pre-selected ambient temperature, the arm 60 will tend to move the contact 61 further away from the contact 56 so that the contacts 56 and 61 will not become engaged until the voltage has reached a higher value in comparison to the average voltage. Thus, the embodiment of FIG. 5 compensates not only for changes in the voltage, but also for changes in ambient temperature, both operating either independently or conjointly to cut the resistance 50' into circuit under predetermined conditions.

While specific embodiments of the invention have been shown and described in detail to illustrate the application of the principles of the invention, it will be understood that the invention may be embodied otherwise without departing from such principles.

What is claimed is:

1. A thermomotive circuit breaker comprising, in combination, an insulating base, a snap action element supported from said base and normally constrained to assume a pre-set restored position, a relatively elongated heat expansible electric resistance element secured to said snap action element and, in its cold and contracted state, constraining said snap action element snapped to a stress-deformed position, said snap action element snapping to its restored position upon pre-set expansion of said resistance element, a pair of load circuits controlling contacts in electric circuit connection with said resistance element, one of said contacts being fixedly mounted with respect to said base, the other of said contacts being mounted to said snap action element and resistance element assembly for movement therewith, said contacts being closed in one position of said snap action element, for flow of current through said snap action element and resistance element assembly, and being open in the other position of said snap action element, an input terminal carried by said base and electrically connected to said one of said contacts, a shunt circuit including a fixed resistance and normally open switch means in series with said fixed resistance, said shunt circuit being electrically connected across said input terminal and said snap action element, said shunt circuit operable, when closed, to complete a circuit in parallel electric circuit connection with said snap action element, said resistance element and said contacts, switch operating means operatively associated with said switch means for controlling same, and circuit means interconnecting said switch operating means and said one of said contacts and effective to apply to said switch operating means, a potential proportional to any potential applied across said contacts, said switch operating means, when said potential exceeds a pre-set value, closing said normally open switch means to complete said shunt circuit.

2. A thermomotive circuit breaker as claimed in claim 1, in which said normally open switch means includes a movable switch arm; and an operating winding for moving said arm, said operating winding constituting said switch operating means.

3. A thermomotive circuit breaker as claimed in claim 2, in which said movable switch arm is a relay armature and said winding is the relay winding.

4. A thermomotive circuit breaker as claimed in claim 2, in which said movable switch arm comprising a thermomotive deflected arm and said winding is a high resistance heating winding on said arm.

5. A thermomotive circuit breaker comprising, in combination, an insulating base, a snap action vane element of electrically conductive metal normally constrained to assume a pre-set restored bent position; a relatively elongated heat expansible electric resistance pull element secured at opposite ends to said vane in the cold and contracted state to constrain said vane bent to a stress-deformed position, said vane snapping to its restored position upon pre-set expansion of said pull element, means fixedly mounting said vane to said base at a point spaced laterally from said pull element for movement of the portion of the vane carrying said pull element during snapping of the vane, a first contact fixedly mounted with respect to said base, a second contact mounted on said pull element and adapted to move therewith during snapping action of said vane to move into and out of engagement with said first contact, an input terminal carried by said base and electrically connected to said first contact, a shunt circuit including a fixed resistance and a normally open switch in series therewith, said shunt circuit being electrically connected across said input terminal and said snap action vane and operable, when closed, to complete a circuit in parallel electric circuit connection with said snap action vane, said resistance pull element and said contacts, said normally open switch including a switch arm, and a relay winding in series with said input terminal and said first contact and including a relay armature adapted to control the operation of said movable switch arm, said relay winding and armature adapted to attract said movable switch arm and effect closure of said switch when the potential applied to said first contact and across said relay winding exceeds a preselected value whereby said shunt circuit is completed when the applied potential exceeds said preselected value.

6. A thermomotive circuit breaker comprising, in combination, an insulating base, a snap action vane element of electrically conductive metal normally constrained to assume a pre-set restored bent position, a relatively elongated heat expansible electric resistance pull element secured at opposite ends to said vane in the cold and contracted state to constrain said vane bent to a stress-deformed position, said vane snapping to its restored position upon pre-set expansion of said pull element, a relay frame of paramagnetic metal mounted on said base and fixedly mounting said vane at a point spaced laterally from said pull element for movement of the portion of the vane carrying said pull element during snapping of the vane, an input terminal mounted on said base, a pair of load circuit controlling contacts in electric circuit connection with said pull element, and including a first contact fixedly mounted with respect to said base and a second contact carried by one of said elements and movable therewith, said contacts being closed in one position of said vane, for flow of current through said element and open in the other position of said vane, an insulated relay winding wound on said frame and having one end electrically connected to said first contact and having the other end electrically connected to said input terminal, a relay armature pivotally connected to said relay frame and electrically connected to said vane element, a relay contact fixedly mounted with respect to said base and engageable by the free end of said relay armature upon a predetermined energization of said winding, said relay armature being normally disengaged from said fixed relay contact, and a resistance electrically connected between said fixed relay contact and said input terminal, said relay winding being subjected to the potential applied to said load circuit controlling contacts, and said relay winding, when said potential exceeds a pre-set value, operating said armature to engage said fixed relay contact to connect said resistance in series in a shunt circuit which is in parallel electric circuit relation with said vane, and pull element, said contacts, and said relay winding.

7. A thermomotive circuit breaker as claimed in claim 6 wherein said relay frame has an extension cooperable with the free end of said armature to provide an air gap; said fixed relay contact comprising an electrically conductive abutment an said base engageable by the free end of said armature and limiting movement of said free end toward said extension of said frame; said resistance having one end electrically connected to said electrically conductive abutment and the other end electrically connected to a second electrically conductive abutment on said base and electrically connected to said other end of said winding; said resistance comprising a relatively elongated high electrical resistance strip bowed intermediate its ends to form an expansion loop.

8. A thermomotive circuit breaker as claimed in claim 7, in which said armature is pivotally connected to said frame through an armature supporting spring normally biasing the free end of said armature away from said fixed relay contact; and a dielectric abutment integral with and projecting from said base and limiting movement of the free end of said armature away from said relay fixed contact.

9. A thermomotive circuit breaker comprising, in combination, an insulating base, a snap action vane element of electrically conductive metal normally constrained to assume a pre-set restored bent position; a relatively elongated heat expansible electric resistance pull element secured at opposite ends to said vane in the cold and contracted state to constrain said vane bent to a stress-deformed position, said vane snapping to its restored position upon pre-set expansion of said pull element; a first substantially upright electrically conductive arm mounting said vane at a point spaced laterally from said pull element to said base, for movement of the portion of the vane carrying said pull element during snapping of the vane; a pair of load circuit controlling contacts in electric circuit connection with said pull element, and including a first relatively fixed contact carried by a second substantially upright electrically conductive arm secured to said base and spaced from said first arm, and a second contact carried by one of said elements and movable therewith, said contacts being closed in one position of said vane, for flow of heating current through said pull element, and open in the other position of said vane; a relatively elongated thermomotive arm fixed at one end to said base and having a free end carrying a first shunt contact; a second shunt contact carried by said vane for movement therewith and normally disengaged from said first shunt contact; a resistance electrically connected between said thermomotive arm and said second substantially upright arm; a heating winding wound on said thermomotive arm and electrically connected between said first and second substantially upright arms; said heating winding being thus shunted by said load circuit controlling contacts when closed and subjected to substantially the full potential applied to said circuit breaker when said circuit controlling contacts are open; said heating winding, when said potential exceeds a pre-set value, heating said thermomotive arm sufficiently for deflection of the latter toward said second shunt contact an amount sufficient to engage said shunt contacts to shunt said pull element load circuit.

10. A thermomotive circuit breaker as claimed in claim 9 including a second and relatively short thermomotive arm secured at a fixed end to said vane and carrying said second shunt contact at its free end, said second-mentioned thermomotive arm deflecting responsive to ambient temperature and thereby controlling the voltage value at which said shunt contacts are engaged by deflection of the first thermomotive arm.

References Cited by the Examiner
UNITED STATES PATENTS

| | | | |
|---|---|---|---|
| 2,712,045 | 6/55 | Welsh | 200—122 |
| 2,806,921 | 9/57 | Welsh | 200—122 |
| 2,822,444 | 2/58 | Colombo et al. | 200—113 |
| 2,917,604 | 12/59 | Krambo et al. | 200—113 |

BERNARD A. GILHEANY, *Primary Examiner.*